E. HANSEN.
MECHANISM ON BUTTER FINISHERS FOR WORKING OUT BUTTERMILK OR WATER.
APPLICATION FILED APR. 13, 1914.
1,137,612.
Patented Apr. 27, 1915.
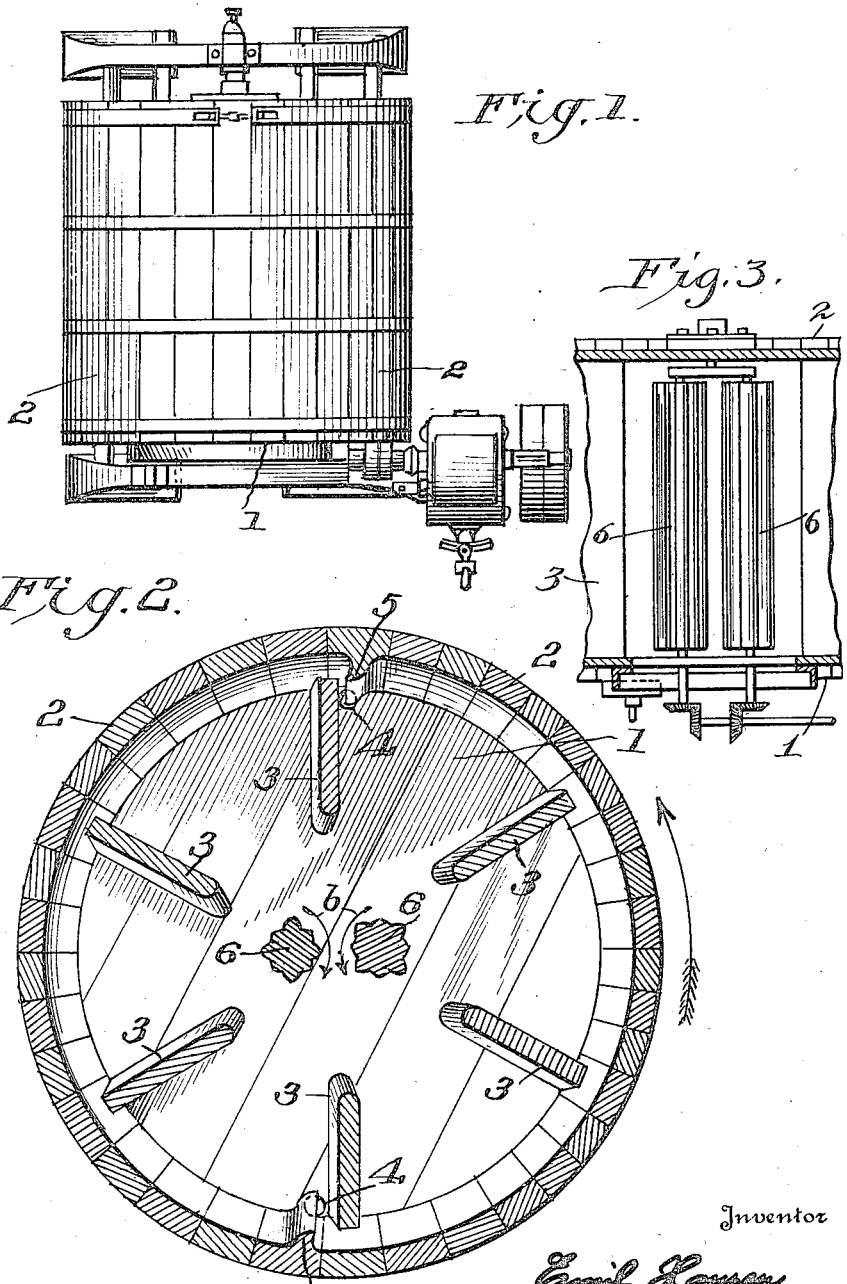

UNITED STATES PATENT OFFICE.

EMIL HANSEN, OF FLENSBURG, GERMANY, ASSIGNOR TO THE FIRM BERGEDORFER EISENWERK AKTIENGESELLSCHAFT, OF BERGEDORF, GERMANY.

MECHANISM ON BUTTER-FINISHERS FOR WORKING OUT BUTTERMILK OR WATER.

1,137,612.

Specification of Letters Patent. Patented Apr. 27, 1915.

Application filed April 13, 1914. Serial No. 831,629.

*To all whom it may concern:*

Be it known that I, EMIL HANSEN, subject of the German Emperor, residing at 12 Waitzslieet, Flensburg, Germany, have invented certain new and useful Improvements in Mechanism on Butter-Finishers for Working Out Buttermilk or Water, of which the following is a specification, reference being had therein to the accompanying drawing.

In working with butter finishers, that is, combined butter and kneading machines, difficulties are often encountered in practice, so that it becomes impossible to knead the butter dry enough. This is of the greatest importance, as in many countries the food law has set a determined limit on the water content of the butter. As a fact penalties have been inflicted on those dairymen who have brought butter into market with too much water in it. Intentional guilt could not be proved against the dairymen, on the contrary they had done all that was possible to satisfy the legal requirements. The trouble lay solely in the technical imperfection of the mechanical auxiliaries; in this case in the butter finisher.

Each butter finisher consists as a rule in a drum of greater or less length, inside of which the kneading rollers are either built in solidly or arranged so as to be taken out. For carrying off the kneaded-out butter milk there are provided two or more outlets formed in the bottom of the barrel. Now in kneading, the buttermilk kneaded out distributes itself over the whole inner circumference of the barrel wall and collects at the lower parting point of the barrel. It is carried off only at that moment, when the opening 4 formed in the bottom of the barrel passes the lower parting point. This lasts only a comparatively short time, so that with butter that is still very wet, and separates out much liquid, only a small part of the buttermilk can be removed from the barrel, the remainder collects more and more in the barrel, until the next opening passes the lower parting point. Now it is obvious, that the butter, which after passing through the rollers keeps on falling farther down in the barrel (arrows *b*) always floats in the water collected, which explains the defective working of the butter finisher. Butter finishers with solidly built in kneaders suffer from this trouble as well as those built with removable ones.

The difficulties that have arisen, it is now intended to remove by this means, that according to the present invention special devices are provided in the actual butter vat, which render it possible to collect the kneaded off liquid and carry it off more quickly, so that the walls of the butter finisher are always kept as dry as possible and the kneaded butter has little opportunity to come into contact with the knead water.

One form of execution is shown in the annexed drawing.

Figure 1 is a side elevation of the device and Fig. 2 is a plan view of the interior of the bottom. Fig. 3 is a side elevation of the kneading rollers, employed in the device.

In the drawing 1 is the bottom of the vat, 2 the walls, 3 beating bars, 5 the catching and carrying-off device, 4 holes in the vat bottom to let out the butter milk or knead water. The beating bars 3 do not close tight against the walls of the vat, but leave a space open, so that the buttermilk can pass unobstructed from chamber to chamber until it reaches the next carry-off device and can get out of the vat at that point. Of course it is also possible to make the beating bars lie against the walls, whereby naturally the effect of the invention is likewise attained. Nothing will be changed in the essence of the invention, whether the catching and carrying-off devices are arranged with a slighter fall toward the outlet openings, for the purpose of carrying off the knead water slower or quicker.

The mode of operation is briefly as follows: The vat turns slowly in the direction of the arrow while the kneading rollers rotate in the direction of the arrows *b*. These kneading rollers have vertical corrugations and are rotatively secured, at their upper ends, to the top of the vat, and at their lower ends are provided with gear wheels, which operatively connect with power. The bar 5 of the buttermilk conveyer has in the position shown passed the lower parting point or outlet of the vat, and forms for the knead water here collected a sort of backwater dam, so that the water is compelled to emerge from the openings 4 in the bottom of the vat. In this way all the knead water collected in the lower horizontal parting point of the vat is surely removed, and it is furthermore impossible for knead water to trickle down from the vat walls. The latter is caught up by the bar 5 and conducted off through 4. The butter produced will, after passing the kneading rollers come in contact only with approximately dry vat walls.

It is easy to see, that the invention can be applied not only to butter finishers according to the annexed drawing, but in equally favorable way to butter finishers of any other construction in order to remove the technical difficulty recited in the beginning.

Claim.

In a device of the character described, a butter vat rotatable on its vertical axis, rotating butter workers in the central portion of said vat, radial beating boards on the bottom of said vat extending from near the vat walls toward the vat's central axis, vertical, inwardly extending projections on said walls located between said walls and the outer ends of said beating boards, there being outlets in the bottom of said vat adjacent said projections adapted to permit the escape of liquid, and means to operate the device, as specified.

EMIL HANSEN.

Witnesses:
JULIUS ROJOKE,
ALBRECHT MÜLLER.